United States Patent [19]
Tom et al.

[11] Patent Number: 5,863,483
[45] Date of Patent: Jan. 26, 1999

[54] SHOCK-ABSORBING BLOCK

[75] Inventors: Joe G. Tom; Philip G. Malone, both of Vicksburg, Miss.

[73] Assignee: The United States of America as represented by the Secretary of the Army, Washington, D.C.

[21] Appl. No.: 800,496

[22] Filed: Feb. 14, 1997

[51] Int. Cl.$^6$ ................................................... B29C 39/00
[52] U.S. Cl. ........................... 264/274; 264/275; 428/76; 428/903.3; 52/DIG. 9; 156/95
[58] Field of Search .............................. 428/2, 903.3, 76; 52/DIG. 9; 156/95; 264/274, 275

[56] References Cited

U.S. PATENT DOCUMENTS

| | | | |
|---|---|---|---|
| 4,348,133 | 9/1982 | Trent et al. | 404/6 |
| 4,553,875 | 11/1985 | Casey | 404/6 |
| 5,103,616 | 4/1992 | Nordberg | 428/903.3 |
| 5,292,467 | 3/1994 | Mandish et al. | 264/112 |
| 5,464,153 | 11/1995 | Broughton | 238/117 |
| 5,507,127 | 4/1996 | Gates | 52/605 |

*Primary Examiner*—Alexander Thomas
*Attorney, Agent, or Firm*—Luther A. Marsh

[57] ABSTRACT

Shock-absorbing blocks for bullet stops at firing ranges and for traffic control are made by encasing scrap rubber tires in concrete. To ensure firm attachment of the tires to the concrete, reinforcements such as wire loops are fastened to the tire. To prevent the formation of air pockets during the pouring of the concrete mixture into a mold holding the tire, vent holes are punched into the side walls of the tire. To allow the concrete mixture to flow under the tire in the mold, the tire is propped up with support blocks. Wires may be strung across the top of the tire and attached to the side walls of the mold to prevent movement of the tire while the concrete is being poured into the mold. The concrete mixture may contain an aqueous foam additive, a stabilizer, and fiber reinforcements such as steel or organic polymers.

2 Claims, 2 Drawing Sheets

SHOCK-ABSORBING BLOCK

GOVERNMENT INTEREST STATEMENT

The invention described herein may be manufactured, licensed, and used by or for governmental purposes without the payment of any royalties thereon.

I. BACKGROUND OF THE INVENTION

1. Field of Invention

This invention relates to a novel and inexpensive shock-absorbing block or wall for firing ranges used for training and practice in marksmanship wherein the target is placed in front of the shock-absorbing block or wall so that bullets are caught. More specifically, the invention relates to a shock-absorbing block or wall made from scrap rubber tires and concrete.

2. Prior Art

The use of rubber, plastic materials, and concrete for making shock-absorbing barriers is taught in the prior art. U.S. Pat. No. 4,553,875 discloses a method of making a barrier by filling a hollow form with a material that solidifies, such as a resin or concrete. U.S. Pat. No. 4,348,133 discloses a method of building a barrier using an outer shell of polymer-concrete and an inner core of portland cement-based concrete. U.S. Pat. No. 5,292,467 teaches a method of building a shock-absorbing barrier by placing a layer of concrete containing chopped pieces of scrap rubber tires over a core of reinforce high-density concrete. U.S. Pat. No. 5,464,153 teaches a method of constructing railroad rail supports using concrete-filled scrap rubber tires.

II. SUMMARY OF THE INVENTION

Shock-absorbing blocks for building barriers are used in many applications including traffic barriers and bullet-catching backstops for firing ranges. Surplus tires have been used as shock-absorbing elements because of their low cost and easy availability. Surplus tires filled with sand have been used to make walls for small-arms training ranges. Tires, used by themselves, are not well suited for such applications because they are readily ignited and because burning tires cause serious air pollution and are difficult to extinguish. Even sand-filled tires can be ignited if the outside of the tires is exposed to air. Furthermore, tires stacked on top of each other tend to deform and topple over. Tires filled with sand partly overcome this stability problem, but the sand is readily washed out by rain. Moreover, wet sand inside the tires may freeze in cold weather, expanding and deforming the tires. Frozen sand and tires do not absorb impacts and may in fact become dangerous obstacles on firing ranges. Thus, there is a need for an improved method of constructing shock-absorbing blocks for traffic barriers and for backstops for firing ranges.

The present invention is directed to a shock-absorbing block or wall made of whole scrap tires totally encased in concrete, preferably foamed and reinforced with fibers. Metal reinforcements are provided to assure firm attachment of the concrete to the tires. In the process of building the shock-absorbing blocks of this invention, holes are punched into the side walls of the scrap tires to allow air to escape during the pouring of concrete into the mold holding the scrap tires, whereby air voids in the concrete are avoided. Such air voids are undesirable because they weaken the shock-absorbing block. Concrete blocks are provided in the mold to support the scrap tires so that concrete can flow under the tires on the bottom of the mold.

Wires or cables may be strung across the top of the tires and attached to the mold to prevent the tires from moving while the concrete mixture is being poured into the mold. These wires or cables may be cut off when the mold is removed.

Blocks may be built with one tire in them. Alternatively, larger blocks may be built having several tires laid side-by-side and stacked on top of each other, preferably in a staggered arrangement.

Fiber reinforcement, such as polypropylene, polyethylene, nylon, or steel may be used to give additional strength to the concrete used in building the shock-absorbing blocks of this invention. Aqueous foam may be added to the concrete mixture to provide increased bulk volume and to reduce its strength and improve its shock-absorbing characteristics.

The shock-absorbing blocks of this invention may also be used as traffic barriers.

III BRIEF DESCRIPTION OF THE DRAWINGS

IV. DETAILED DESCRIPTION OF THE INVENTION

Figure 1:
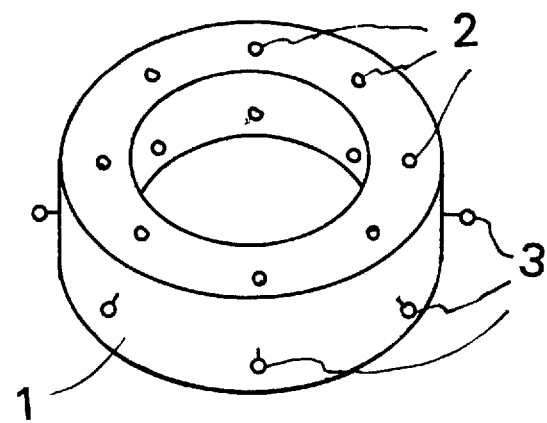
FIG. 1 is a view of a scrap tire provided with reinforcements and air vent holes.

With reference to FIG. 1, a scrap tire 1 has a plurality of holes 2 punched into its side walls, these holes serving the purpose of allowing air to escape from the interior of the tire while concrete is being poured into a mold or form holding the tire. The tire 1 further has reinforcements, such as wire loops 3, around its periphery whose purpose it is to firmly attach the tire to the concrete that is poured around the tire. Alternatively, pieces of wire mesh may be used as reinforcements.

Figure 2:
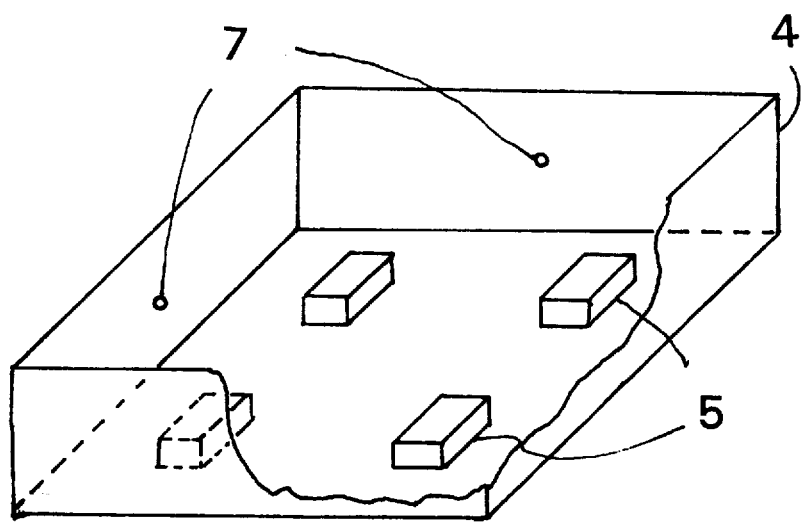
FIG. 2 is a view of a form before the pouring of concrete therein showing support blocks for the scrap tire.

With reference to FIG. 2, a mold or form 4, typically built from plywood, has support blocks 5 on its bottom surface. These blocks preferably are made of concrete, though other materials such as scrap pieces of 2×4 lumber, may be used. Holes 7 in the sidewall of the mold may be provided to allow wires or cables to be run across the tops of the tires to hold them in place while the concrete is being poured into the mold.

Figure 3:
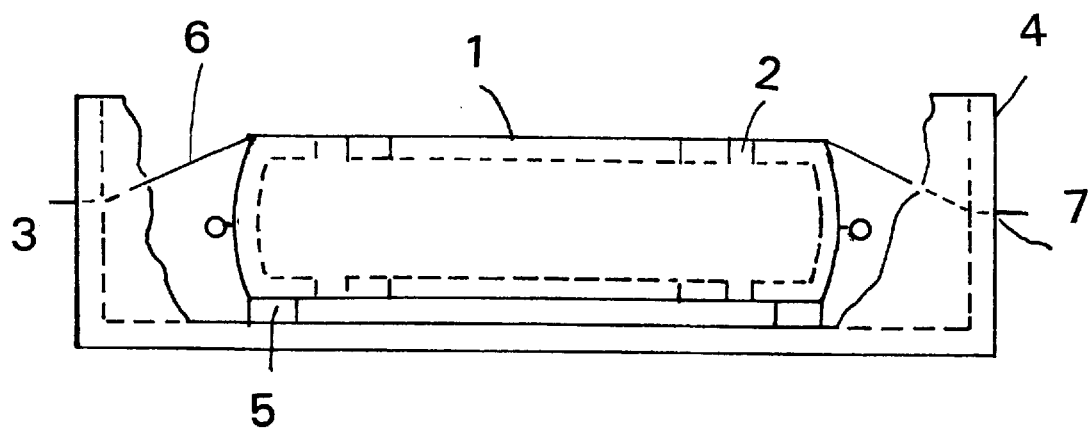
FIG. 3 is a side view of a form with a scrap tire placed therein.

FIG. 3 illustrates the placement of a tire 1 in a mold 4 on the support blocks 5 so as to ensure that concrete can flow under the tire, completely surrounding it from all directions. Wire 6 passing through holes 7 hold the tire in place while concrete is being poured into the mold. These wires or cables are cut when the mold is removed.

Figure 4:
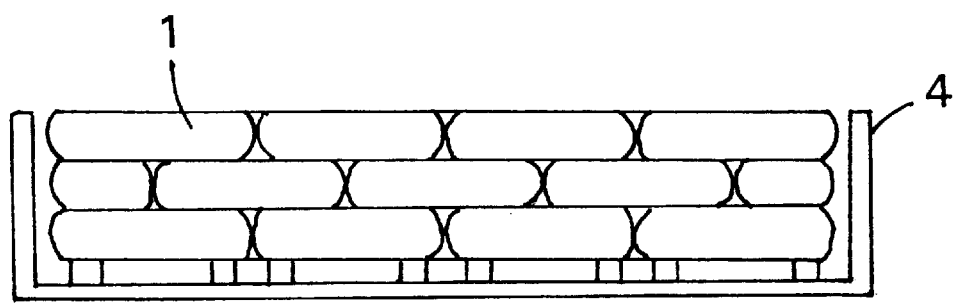
FIG. 4 is a side view of a larger shock-absorbing block having several scrap tires placed in a form.

With reference to FIG. 4, in the construction of larger shock-absorbing blocks having several tires laid side-by-side and stacked upon one another, the preferred staggered arrangement is illustrated. However, any arrangement of scrap tires is within the scope of this invention.

The tires may be attached to one another by bolts or rivets through the treads or sidewalls of the tires. This option is not illustrated.

The preferred composition of the shock-absorbing concrete is as follows:

TABLE I

Formulation of Shock-Absorbing Concrete, Nominal 1442 kg/m$^3$

|  | Per m$^3$ |  |
| --- | --- | --- |
| Portland cement | 577 | kg |
| Sand (ASTM C 33) | 577 | kg |
| Water | 267 | kg |
| Aqueous foam | 330 | liters |
| Stabilizer | 160 | grams |
| Steel fiber | 115 | kg |

With the addition of steel fiber, the actual density of the concrete is 1554 kg/m$^3$. If the shock-absorbing blocks are used as traffic barriers, organic polymer fibers such as polypropylene, polyethylene, or nylon may be used.

The aqueous foam is an item typically used in the insulating concrete industry to produce light-weight cellular foam concrete. The foam agent may, for example, be Cellufoam WF which is foamed by passage through a cavitating pump, such as a Cellufoam Systems Model 620-6 Foam Generator. The pump and foaming agent are marketed by Cellufoam Concrete Systems, Inc., of Scarborough, Ontario, Canada. The foam is added to a paste of water, cement, and sand. The frothy mixture of foam, cement, sand and water may contain 50–75% of air by volume in the form of fine air bubbles.

Because there is a tendency for the sand and cement grains to settle out, a stabilizer is preferably added to the paste. Typically, Methocel K100M is used. It is supplied by Dow Chemical Corporation, Midland, Mich.

The steel fiber reinforcements typically are 1-inch long straight steel fibers marketed by Mitchell Fibercon Corporation, Pittsburgh, Pa. Polypropylene fiber reinforcements are supplied by Forta Corporation, Grove City, Pa.

While it is apparent that the invention herein described represents a preferred embodiment of the invention, variations in design details will be obvious to those skilled in the art. Such variations are within the scope of this disclosure.

What is claimed is:

1. A method of making a shock-absorbing block of a rubber tire encased in foamed concrete comprising the steps of:

(a) punching a plurality of holes in the side wall of a rubber tire;

(b) placing at least three support blocks on the bottom surface of the mold;

(c) placing the tire on the support blocks such that it is not resting on the bottom surface of the mold;

(d) pouring a mixture of portland cement, sand and water into the mold;

(e) allowing the mixture to cure in the mold; and (f) removing the mold.

2. The method of claim 1 wherein, before the mixture of portland cement, sand and water is poured into the mold, the tire is held in place by a wire attached to the side walls of the mold.

* * * * *